United States Patent Office.

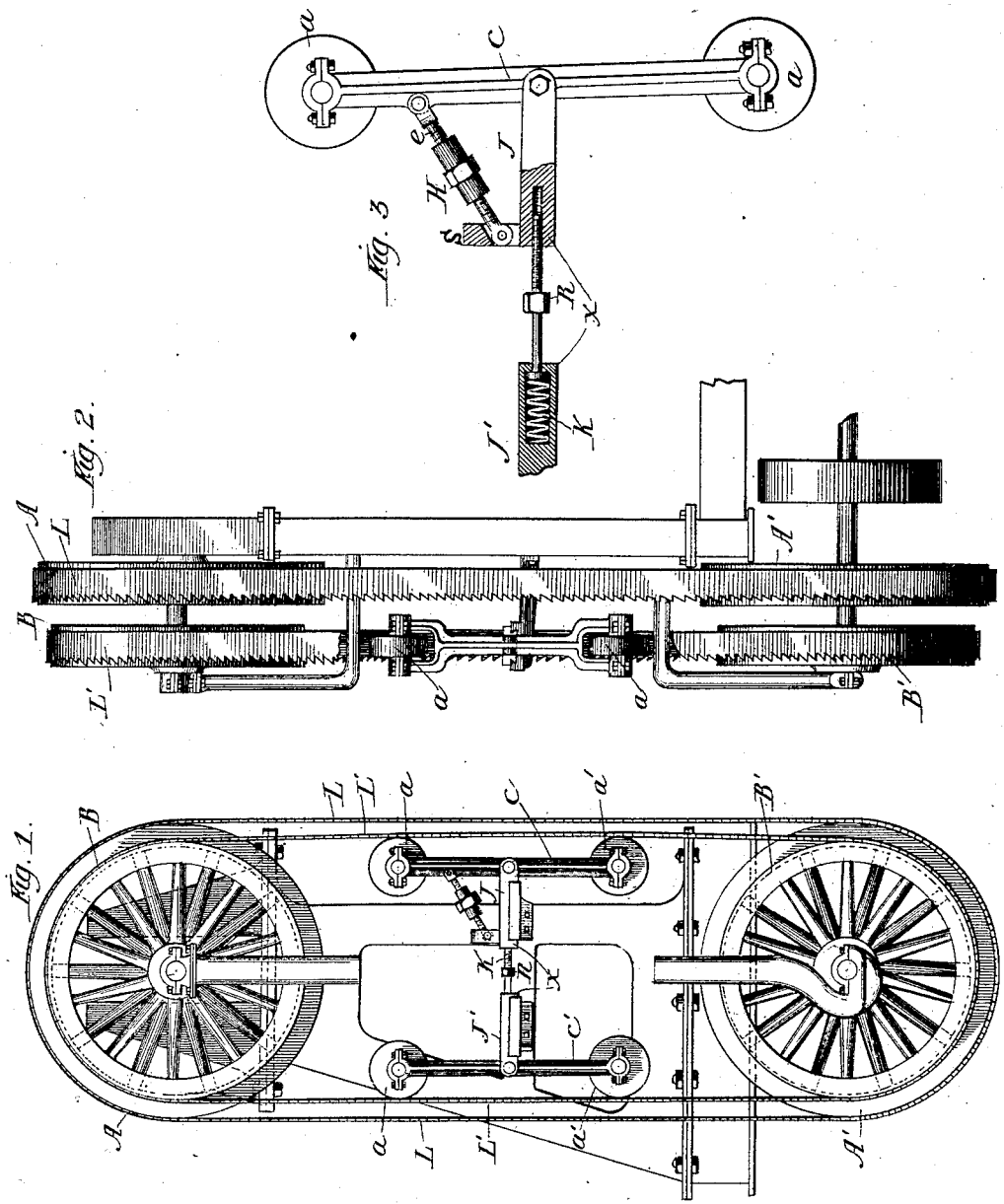

JAMES LORENZO GAGE, OF CHICAGO, ILLINOIS, ASSIGNOR OF ONE-HALF TO CHARLES EDWARD WOOLLEY AND EDWIN L. GAGE, BOTH OF SAME PLACE.

BAND-SAW MILL.

SPECIFICATION forming part of Letters Patent No. 354,407, dated December 14, 1886

Application filed April 29, 1886. Serial No. 200,614. (No model.)

*To all whom it may concern:*

Be it known that I, JAMES LORENZO GAGE, a subject of the Queen of Great Britain, residing at Chicago, in Cook county, and State of Illinois, have invented a new and useful Improvement in Band-Saw Mills, of which the following is a specification.

I attain these improvements by the mechanism illustrated in the accompanying drawings, in which Figure 1 is a front elevation; Fig. 2, side elevation; Fig. 3, enlarged elevation of frame X.

Similar letters refer to similar parts throughout the several views.

The object of my invention is to run band-saws in gangs of two or more saws, and at the same time vary the distance between the saws so as to vary the thickness of boards; also, to saw bevel lumber—such as siding for houses—and to provide a means for taking up the stretch of the saw if it should get warm, and at the same time keep the saw at a proper tension.

A and B and A' and B' are two sets of cone-pulleys on separate shafts, around which the several saws L and L' run. The pulleys B and B' are smaller than A and A'. This sets the saws apart half of the difference of the diameters of the pulleys. By this means two boards of the same thickness can be cut. To change the position of the auxiliary L', I provide a frame, X, made in two parts, J and J', operated and held together by screw R. In the outer end of J, I put an arm, C. In the top and bottom, and above and below the part that cuts the logs, I pivot pulleys $a$ and $a'$. This arm is pivoted at the center and held in position by rod $e$, connected to standard $s$, which has a nut, H, which will adjust the arm $c$ so as to either keep it in a perpendicular position or crowd the saw into a line to cut bevel. In the ends of J' the same kind of arm $c$ and pulleys $a$ and $a'$ are used. When in position, these pulleys, $a$ and $a$ and $a'$ and $a'$ press against the saw and strain it. In the part J', I put a spring, K, that receives the pressure of the screw R, (when it is operated,) to spread the parts J and J'. This pressure closes up the spring, so that if the saw should heat and stretch it yields and takes up the slack and keeps it strained. The usual way of doing this is by putting a spring under the upper shaft. When the parts J and J' are spread by the screw, they can be moved in unison by a rack and pinion or a similar device. This allows either side of the saw to be moved from and to the line of cut of the rear saw and at the same time keeping that portion of saw L' in a parallel line with the rear saw, L, and by this change vary the thickness of the lumber between the saws.

The log is carried on a carriage of the usual kind between pulleys $a$ and $a'$.

The operation of this mill is as follows: The first saw being put in place is strained by the usual method—that is, by raising the upper shaft. The auxiliary saw or saws are then put on their pulleys, and by turning screw R the parts J and J' of the frame X are separated until the saw is strained by the rollers $a$ and $a$ and $a'$ and $a'$. Then by moving the whole of the frame X either way it alters the line of cut of the auxiliary saw. At the same time spring K is pressed together, and if the saw, by reason of heat, should slacken it presses it and keeps it strained. This appliance can be put on the first saw and operate as well as the spring under the upper shaft.

What I claim, and desire to secure by Letters Patent, is—

1. The combination, with the saws L L' and their pulleys, of gage-frames having guide-pulleys arranged one above and the other below the log to move the auxiliary saw L' to and from the line of cut of the saw L, as set forth.

2. In a band-saw substantially as described, the divided frame X, screw R, and spring K, arranged as shown, combined with the saws L L' and with pulleys $a$ $a'$, carried on said frame and arranged to bear upon the auxiliary saw L', above and below the log, as set forth.

3. The combination, with the band-saws and their pulleys, of a two-part frame, X, carrying friction-rollers, and a screw, R, which adjusts the said parts to throw the smaller band outward, as set forth.

4. The combination, with the band saws L L' and their pulleys, of the two part frame X, arranged within the saws, the screw R, for adjusting the parts J J' of said frame, the arm C, having the guide-pulleys $a$ $a'$ pivoted in the part J, and the nut H, for adjusting the angle of the arm C at will, as set forth.

Signed at Chicago, in Cook county, State of Illinois, this 26th of April, 1886.

JAMES LORENZO GAGE.

Witnesses:
    GEO. A. GAGE,
    JOHN MUELLER.